United States Patent Office 3,337,496
Patented Aug. 22, 1967

3,337,496
NOVEL ORGANOSILOXANE-SILICATE COPOLYMERS
Arthur N. Pines, Snyder, and Eugene A. Zientek, Kenmore, N.Y., assignors to Union Carbide Corporation, a corporation of New York
No Drawing. Filed Apr. 26, 1961, Ser. No. 105,535
15 Claims. (Cl. 260—46.5)

This invention relates to organosilicon compounds and, more particularly, to copolymers of organosiloxanes and silicates. This invention further relates to a process for inhibiting corrosion and to inhibited aqueous alcohol compositions wherein the novel copolymers are employed as corrosion inhibitors.

The copolymers of this invention contain (1) from 0.1 to 99.9 parts by weight (per 100 parts by weight of the copolymer) of (a) at least one siloxane group represented by the formula:

$$RSiO_{1.5} \tag{1}$$

wherein R is a methyl, ethyl, phenyl or vinyl group and/or (b) at least one siloxane group represented by the formula:

$$[YC_aH_{2a}]_b\underset{\underset{R'_c}{|}}{Si}O_{\frac{4-(b+c)}{2}} \tag{2}$$

wherein Y is a cyano group, $CH_2(OH)CH(OH)$— group, $CH_2(OH)CH(OH)CH_2$— group,

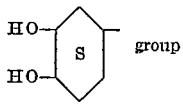

group $CH_2(OH)CH(OH)CH_2O$— or $R''(OCH_2CH_2)_n(OC_3H_6)_mO$— group, R'' is a monovalent hydrocarbon group or a hydrogen atom, n has a value of at least one and preferably has a value from 1 to 20, m has a value from 0 to 20 or higher and preferably has a value from 0 to 10, the ratio of n to m is at least 2 to 1, a has a value of at least 2 and up to 10 or higher (preferably from 2 to 4 inclusive), $C_aH_{2a}$ is an alkylene group, the group represented by Y is separated from the silicon atom by at least two successive carbon atoms of the group represented by $C_aH_{2a}$, b has a value from 1 to 3 inclusive (preferably 1), R' is a monovalent hydrocarbon group, c has a value from 0 to 2 inclusive and (b+c) has a value from 1 to 3 inclusive; and (2) from 0.1 to 99.9 parts by weight (per 100 parts by weight of the copolymer) of at least one silicate group represented by the formula:

$$[M_{1/d}O]_eSiO_{4-e/2} \tag{3}$$

wherein M is a cation that forms a water soluble silicate, d is the valence of the cation represented by M and has a value of at least one and e has a value from 1 to 3 inclusive.

Preferably, the copolymers of this invention contain from 15 to 45 parts by weight (per 100 parts by weight of the copolymer) of groups represented by Formula 1 and/or 2 and from 55 to 85 parts by weight (per 100 parts by weight of the copolymer) of groups represented by Formula 3.

In addition to the groups represented by Formulae 1 and/or 2 and 3, the copolymers of this invention can contain groups represented by the formulae:

$$R'''SiO_{1.5} \tag{4a}$$

$$R_2'SiO \tag{4b}$$

and/or $$R_3'SiO_{0.5} \tag{4c}$$

wherein R''' is a monovalent hydrocarbon group other than a methyl, ethyl, phenyl or vinyl group and R' has the above-defined meaning. These latter copolymers contain from 0.1 to 99.8 parts by weight of groups represented by Formula 1 and/or 2, from 0.1 to 99.8 parts by weight of groups represented by Formula 3 and from 0.1 to 99.8 parts by weight of groups represented by Formulae 4a, 4b and/or 4c per 100 parts by weight of the copolymer. Preferably these latter copolymers contain from 10 to 45 parts by weight of groups represented by Formula 1 and/or 2 from 50 to 85 parts by weight of groups represented by Formula 3 and from 5 to 15 parts by weight of groups represented by Formulae 4a, 4b and/or 4c per 100 parts by weight of the copolymer.

The groups represented by Formula 1 are the methylsiloxy, ethylsiloxy, phenylsiloxy and vinylsiloxy groups.

Illustrative of the groups represented by Formula 2 are the beta-cyanoethylsiloxy, gamma-cyanopropylsiloxy, delta-cyanobutyl, gamma-cyanoisobutylsiloxy, beta-cyanoethyl(methyl)siloxy $CH_2(OH)CH(OH)CH_2CH_2SiO_{1.5}$ $CH_2(OH)CH(OH)(CH_2)_3SiO_{1.5}$

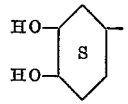

$CH_2CH_2Si(CH_3)_2O_{0.5}$ $CH_2(OH)CH(OH)CH_2O$—

$CH_3(OCH_2CH_2)_2O(CH_2)_3SiO_{1.5}$ or $H(OCH_2CH_2)_{10}(OC_3H_6)_2OCH_2CH_2SiO_{1.5}$ groups.

Illustrative of the groups represented by Formula 3 are the groups having the formulae: $KOSiO_{1.5}$, $NaOSiO_{1.5}$, $(KO)_2SiO$, $(CH_3)_4NOSiO_{1.5}$, $(NaO)_2SiO$, $(KO)_3SiO_{0.5}$ and $(NaO)_3SiO_{0.5}$.

The silicon atom in each group represented by Formulae 1, 2 and 3 is bonded through at least one oxygen atom to another silicon atom. In addition to the substituents indicated in these formulae, some or all of the silicon atoms in the groups represented by Formulae 1, 2 and 3 can be bonded to hydrogen atoms through oxygen (in which case the inhibitor contains the Si—OH group). Furthermore, some or all of the silicon atoms in the groups represented by the Formulae 1 and 3 can also be bonded to monovalent hydrocarbon groups through oxygen (in which case the inhibitors contain Si—OR¹ groups) or to the cations represented by M through oxygen (in which case the inhibitor contains additional $M_{1/d}OSi$ groups).

Illustrative of the monovalent hydrocarbon groups represented by R¹ in Formulae 2, 4b and 4c and R'' in Formula 2 are the linear alkyl groups (for example the methyl, ethyl, propyl, butyl and octadecyl groups), the cyclic alkyl groups (for example the cyclohexyl and cyclopentyl groups), the linear alkenyl groups (for example the vinyl and the butenyl groups), the cyclic alkenyl groups (for example the cyclopentenyl and the cyclohexenyl groups), the aryl groups (for example the phenyl and naphthyl groups), the alkaryl groups (for example the tolyl group) and the aralkyl groups (for example the benzyl and beta-phenylethyl groups). Preferably these monovalent hydrocarbon groups contain up to six carbon atoms.

Illustrative of the cations that form water soluble silicates represented by M in Formula 3 are the various monovalent and polyvalent inorganic and organic cations that form water soluble silicates. Typical monovalent cations are alkaline metal cations [e.g. the sodium, potassium, lithium and rubidium cations]; and the tetraorgano ammonium cations [e.g. the tetra(alkyl) ammonium cations such as the tetra(methyl) ammonium cation, and the tetra(ethyl) ammonium cation; the tetra (mixed aryl-alkyl and mixed aralkyl-alkyl) ammonium cations such as the phenyltrimethyl ammonium cation and the benzyltrimethyl ammonium cation; and the tetra(hydroxyalkyl) ammonium cation such as the tetra(hydroxyethyl) ammonium cation]. Typical of polyvalent cations are those produced by converting polyamines such as guanidine or ethylene diamine to poly ammonium hydroxides. Illustrative of such polyvalent cations are $$(+)H_3NC(:NH)NH_3^{(+)}$$

and $(+)H_3N(CH_2)_2NH_3^{(+)}$. In the case of monovalent cations, the value of $d$ in Formula 3 is one and, in the case of the polyvalent cations, the value of $d$ in Formula 3 is at least 2 and preferably 2 or 3. The most preferred cations are sodium and, more especially, potassium.

Groups represented by Formula 4a include the amylsiloxy, beta-phenylethylsiloxy and the hexylsiloxy groups. Groups represented by Formula 4b include the dimethylsiloxy, diethylsiloxy, phenyl(methyl)siloxy and ethyl(vinyl)siloxy groups. Groups represented by Formula 4c include the trimethylsiloxy and triphenylsiloxy groups.

The copolymers of this invention can be produced by reacting (A) an organosiloxane composed only of groups represented by Formula 1 and/or 2 or an organosiloxane composed of groups represented by Formula 1 and/or 2 and groups represented by Formula 4a, 4b and/or 4c, and (B) a water soluble silicate composed of groups represented by Formula 3.

The starting organosiloxanes employed in producing the copolymers of this invention include such starting homopolymers as those composed only of $CH_3SiO_{1.5}$, $C_2H_5SiO_{1.5}$ or $$CH_2(OH)CH(OH)CH_2O(CH_2)_3SiO_{1.5}$$

groups and such starting copolymers as those composed of one or more of the latter groups and one or more $(CH_3)_2SiO$, $(C_6H_5)_2SiO$ or $C_6H_5CH_2CH_2SiO_{1.5}$ groups.

Starting organosiloxanes combining only groups represented by Formula 1 and/or 2 are conveniently produced by hydrolyzing and condensing organosilanes represented by the formula:

$$RSiX_3 \qquad (5)$$

and/or

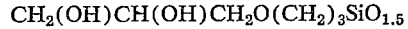 (6)

wherein $a$, $b$, $c$, $(a+b)$ and R' have the above-defined meanings, Y' has the meaning defined for Y or is a

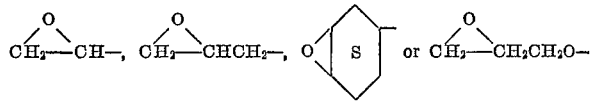

group and X is an alkoxy group (e.g. a methoxy, ethoxy, propoxy or butoxy group). The epoxy-containing groups represented by Y' are converted to dihydroxy groups during the hydrolysis and condensation of the silane according to the equation:

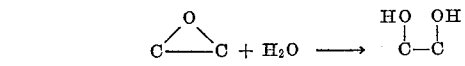

Starting organosiloxanes containing groups represented by Formulas 4a, 4b and/or 4c as well as groups represented by Formula 1 and/or 2 are conveniently produced by cohydrolyzing and condensing organosilanes represented by Formula 5 and/or 6 and organosilanes represented by the Formulas:

$$R'''SiX_3 \qquad (7a)$$
$$R'_2SiX_2 \qquad (7b)$$

and/or $$R'_3SiX \qquad (7c)$$

wherein R''', R' and X have the above-defined meaning.

Organosilanes represented by Formula 6 wherein Y' is an epoxy-containing group can be produced by the platinum-catalyzed reaction of an epoxy-containing olefin (e.g. allyl glycidyl ether) and a hydrogensilane represented by the formula:

 (8)

wherein R', X, $b$ and $c$ have the above-defined meanings. Organosilanes represented by Formula 6 wherein Y' is a cyano group can be produced by the triphenylphosphine or trialkylamine catalyzed reaction of an olefinic nitrile (e.g. acrylonitrile) and a hydrogensilane represented by Formula 8.

The starting silciates used in producing the copolymers of this invention are water soluble and composed of cation oxide units (i.e. $M_{1/d}O$ wherein M is the cation of a water soluble silicate and $d$ is the valence of the cation) and silicon dioxide units (i.e. $SiO_2$). These silicates can be represented by the average formula:

$$(M_{2/d}O)_n(SiO_2) \qquad (9)$$

wherein $n$ has a value from 0.5 to 4, or preferably from 1.0 to 2.5, and wherein M and $d$ have the above-defined meanings. Alternately such silicates can be described as composed of groups represented by Formula 3. Illustrative of these silicates are the alkali metal orthosilicates [which have the formula $(M^1{}_2O)_2(SiO)_2$ where $M^1$ is an alkali metal], the alkali metal metasilicates [which have the formula $[(M^1{}_2O)(SiO_2)]$, the alkali metal tetrasilicates [which have the formula $(M^1{}_2O)(SiO_2)_4$], the alkali metal disilicates [which have the formula $$(M^1{}_2O)(SiO_2)_2]$$

and the tetra(organo)ammonium silicates. Specific examples of these silicates are potassium meta silicate, sodium orthosilicate, potassium disilicate, lithium orthosilicate, lithium metasilicate, lithium disilicate, rubidium disilicate, rubidium tetrasilicate, mixed silicates (e.g. $Na_2O \cdot Li_2O \cdot 2SiO_2$ and $K_2O \cdot Li_2O \cdot 4SiO_2$), tetra(methyl) ammonium silicate, tetra(ethyl) ammonium silicate, phenyltrimethyl ammonium silicate, benzyltrimethyl ammonium silicate, guanidine silicate and tetra(hydroxy-ethyl) ammonium silicate. The preferred silicates are sodium and potassium silicates, especially sodium disilicate and potassium disilicate.

The starting silicate used in producing the copolymers of this invention can be added to the reaction mixture as such or it can be formed in situ by adding the appropriate hydroxide (e.g. NaOH or KOH) and silica to the reaction mixture.

Mixtures of the above-described organosilanes and water soluble silicates can be formed. These mixtures can contain water initially or can be anhydrous initially and then mixed with water. The water converts the organosilanes to organosiloxanes in situ by hydrolysis and condensation. The organosiloxanes so formed can react with the silicate to produce a copolymer of this invention.

The organosilanes represented by Formulae 5, 6, 7a, 7b and 7c are partially converted to organosiloxanes by hydrolysis and condensation reactions when mixed with water even at room temperature. Heating the mixture of the silane and water serves to complete the reaction which is catalyzed by the silicate. The organosiloxanes so formed then react with the silicate. Distillation of the alcohol formed in the hydrolysis can be performed to remove the alcohol to concentrate the copolymer.

The amount of water used in the latter process for producing the copolymers of this invention is at least that amount required to hydrolyze at least one group in each silane represented by X in Formulae 5, 6, 7a, 7b, and 7c. Amounts of water in excess of that amount required to hydrolyze all of the groups represented by X are usually preferred since it is generally desirable to have an excess of water present to serve as a medium within which the inhibitors can be formed. Thus, from 0.5 to 2000 moles of water per mole of the silane represented by Formulae 5, 6, 7a, 7b and 7c are preferred. Although other amounts of water can be used they are usually not desirable since lesser amounts result in incomplete reaction and since greater amounts result in excessive dilution of the reaction mixture.

The temperature at which the starting organosiloxane and silicate are maintained and at which they react to produce the copolymers of this invention can vary widely. Thus, temperatures from 20° C. to 150° C. can be used. However, temperatures from 20° C. to 115° C. are preferred. The use of other temperatures is generally undesirable since no advantage is gained thereby. When the starting siloxane is being formed in situ, the conversion of the silanes represented by Formulae 5, 6, 7a, 7b and 7c to siloxanes is essentially completed by heating the mixture. The alkoxy groups in the starting silanes are converted to alcohols that can be volatilized during the heating.

The copolymers of this invention are remarkably soluble in aqueous liquids (i.e. in water and in solutions containing water and water soluble materials such as water soluble organic liquids). Moreover, these copolymers inhibit to a remarkable degree the corrosion of metals that are in contact with aqueous liquids to which the copolymers have been added. In particular, aqueous alcohol solutions containing copolymers of this invention cause remarkably less corrosion than uninhibited aqueous alcohol solutions and hence are admirably suited as noncorrosive coolants for use, for example, in the cooling systems of internal combustion engines.

When the copolymers of this invention are used as corrosion inhibitors, the copolymer is added to an aqueous liquid and, for best results, the copolymer is then uniformly dispersed throughout the liquid. Any suitable means can be used to disperse the copolymer throughout the liquid. Thus, in the case of moving liquids that are in contact with the metal to be protected, the copolymer can be added to the liquid while the liquid is in use and dispersion of the copolymer throughout the liquid is achieved by the movement of the liquid. However, the copolymer can be added to the liquid (prior to the use of the liquid in contact with the metal to be protected) and the copolymer can be dispersed throughout the liquid by stirring the liquid. This latter procedure is preferred where the liquid is to be stored or where the liquid undergoes little movement when in use. These procedures allow the copolymer to readily dissolve in the water or aqueous solution.

When the copolymers of this invention are used as corrosion inhibitors, the copolymer can be added as such to the aqueous liquid. Alternately, materials can be added to the aqueous liquid which react with the water in the liquid to produce the copolymer in situ. By way of illustration, a silane represented by Formula 5 or 6 or a mixture of silanes represented by Formulae 5, 6, 7a, 7b and/or 7c can be added to an aqueous liquid along with a water soluble silicate to produce the copolymer in the liquid.

The copolymers of this invention are generally useful for the protection of metals that come into contact with an aqueous liquid. Suitable liquids are pure water, aqueous solutions containing inorganic solutes and solutions containing water and water-soluble organic compounds, especially water soluble or miscible organic liquids. Illustrative of suitable aqueous solutions containing inorganic solutes are aqueous sodium or potassium chloride refrigerating solutions, corrosive well water or river water containing normal chlorides, carbonates and sulfates which may be used as process or cooling water in industry, and the like. Illustrative of suitable solutions containing water and a water soluble organic liquid are solutions containing water and monohydric or polyhydric alcohols (e.g. methanol, ethanol, propanol, ethylene glycol, propylene glycol and glycerol), hydroxyl and alkoxy end-blocked polyalkylene oxides (such as hydroxyl end-blocked polyethylene oxide), sulfoxides (such as methylsulfoxide), formamides (such as dimethylformamide) or cyclic ethers free of olefinic unsaturation (such as tetrahydrofuran, dioxane and the like). Suitable solutions containing water and a water-soluble organic liquid should contain at least 0.1 part by weight, or preferably at least 5.0 parts by weight, of water per 100 parts by weight of the water and the organic liquid.

The copolymers of this invention are generally useful in the protection of all metals and alloys that are used in industrial processes and apparatus. Metals whose corrosion is retarded by the copolymers of this invention include the metals below sodium in the electromotive series (e.g. magnesium, aluminum, copper, iron, manganese, nickel, lead, silver, tin, beryllium and zinc) as well as the alloys of such metals (e.g. brass, bronze, solder alloys, steel and the like). Such metals are solids at 25° C. and normally become corroded when in prolonged contact with water, particularly when the water is at elevated temperatures and/or contains electrolytes (e.g. acidic solutes). The copolymers of this invention are particularly useful in the protection of brass, iron, copper and aluminum.

The amount of the copolymers of this invention used in inhibiting corrosion of metals in contact with aqueous liquids is dependent upon the temperature, type of metal or metals being protected, type of any organic liquid in the solution, pH of the aqueous liquid, velocity of the aqueous liquid, inorganic solutes (e.g. electrolytes such as chlorides, sulfates and bicarbonates) in the aqueous liquid and prior treatment or corrosion of the metal. Generally, from 0.01 part per 10 parts by weight of the copolymer per 100 parts by weight of the aqueous liquid to which the inhibitor is added are useful. Preferably from 0.5 part to 2.5 parts by weight of the copolymer per 100 parts by weight of the aqueous liquid are used.

Compared with known inhibitors used in preventing corrosion of metals that are in contact with water, the copolymers of this invention provide numerous advantages. Thus, the copolymers can be added to a wide variety of aqueous solutions and inhibit the corrosion a wide variety of metals. In addition, the copolymers are effective over a wide temperature range and these inhibitors do not cause the liquids in which they are employed to foam excessively. Furthermore, these copolymers do not promote the decomposition of any organic liquids present in the liquid nor do they attack other organic materials with which the liquid may come in contact.

The copolymers of this invention are useful in preventing the corrosiion of metals that are cleaned by corrosive solutions or that are used in cooling coils, boilers, refrigeration and air conditioning equipment, heat exchange tubes, storage tanks for liquids, pipes, solvent containers, tank cars, ballast tanks containing sea water and the like. The copolymers of this invention are particularly useful for inhibiting the corrosion of the cooling systems of internal combustion engines in contact with aqueous alcohol coolant compositions.

Inhibited alcohol compositions containing an alcohol and a copolymer of this invention as a corrosion inhibitor are remarkably useful as anti-freezes and coolants for the cooling systems of internal combustion engines. These anti-freezes are inhibited alcohol solutions containing no water or relatively small amounts of water and these coolants are inhibited alcohol solutions containing relatively large amounts of water. The concentrates or anti-freeze compositions are adapted to economical shipment and storage and the coolants are adapted to use, as such, as heat transfer media in the cooling systems of internal combustion engines. In practice, the concentrate can be shipped to the point where it is to be added to the cooling system and there it can be diluted to form a coolant. Water imparts desirable properties to both the concentrate and coolant compositions (e.g. small amounts of water serve to lower the freezing point of the concentrate compositions and large amounts of water impart good heat transfer properties to the coolant compositions). These compositions can contain from 0 part by weight to 900 parts by weight of water per 100 parts by weight of the alcohol. It is desirable that the coolant compositions contain from 30 to 900 parts by weight of water per 100 parts by weight of the alcohol. It is desirable that the concentrates contain from 0.1 part to 10 parts by weight (or more desirably from 2 parts to 5 parts by weight) of water per 100 parts by weight of the alcohol. In the latter case, the amount of water with which the concentrate compositions is mixed to provide a coolant should be such that the resulting coolant composition contains from 30 parts to 900 parts by weight of water per 100 parts by weight of the alcohol. The relative amount of water and alcohol in these compositions can be varied to lower the freezing point of the compositions by the desired amount. The pH of the inhibited aqueous alcohol compositions of this invention should be greater than seven to minimize corrosion of metals with which the compositions come into contact.

If desired, various additives can be added to the above-described inhibited alcohol compositions in particular instances for imparting special properties. By way of illustration, anti-foam agents, identifying dyes, pH indicators, conventional inhibitors, sealants which prevent leakage of the coolant from the cooling system, anti-creep agents which prevent seepage of the coolant into the crankcase and the like can be added to these compositions.

The above-described inhibited alcohol compositions can be formed in any convenient manner, e.g. by adding an alcohol, the organosilicon inhibitor and water to a container and stirring the mixture.

In addition to being useful as corrosion inhibitors, the copolymers of this invention are useful as coating and laminating resins. Thus aqueous solutions of these copolymers can be applied to steel surfaces by conventional coating methods and heat applied to volatilize the water and to form a protective coating on the steel surface. In addition these copolymers can be used to bind successive layers of glass fibers in accordance with conventional procedures to produce laminates.

The improvements in corrosion inhibition resulting from the use of the copolymers of this invention were found and evaluated by elaborate laboratory tests designed to simulate field conditions.

*Two-hundred hour corrosion test.*—This is a laboratory test which has proven over many years to be useful in evaluating inhibitors for use in aqueous alcohol anti-freeze solutions such as are used in the cooling systems of internal combustion engines. The test involves immersing clean strips of metal (usually iron, aluminum, brass and copper) and a brass coupon on which is a spot of solder, composed of 50 wt.-percent lead and 50 wt.-percent tin, in the test fluid with heating and aeration for a period of 200 hours. After this exposure, the specimens are cleaned and corrosion of the metal strips is measured by weight loss in milligrams. The corrosion of the spot of solder on the brass coupon is given a rating (called Solder Spot Rating, abbreviated SS in the examples) by visual inspection with a rating of 6 indicating little or no corrosion and a rating of 0 indicating very severe corrosion.

Each test unit consists of 600 milliliter glass beaker equipped with a reflux condenser and an aeration tube. The test specimens are cut from $\frac{1}{16}$ inch sheet stock usually with a total surface area of about nine (9) square inches. Test temperature is 100° C. and aeration rate is 0.028 cubic feet per minute. Specimens are separated with Z shaped glass rods and are covered with 350 cc. of solution. The water used in preparing test solutions has 100 parts per million added of each of bicarbonate, chloride, and sulfate ions as sodium salts. This gives an accelerated corrosion rate that simulates the corrosion rate that prevails when natural water is used to dilute anti-freeze compositions in actual practice. Duplicate tests are run simultaneously and both values or the average values of weight loss, final pH and final RA (defined below) are given.

The "Reserve Alkalinity" of an anti-freeze composition is a measure of the ability of the composition to resist or decrease in pH due to the presence of acidic materials such as are produced by the decomposition of ethylene glycol. Reserve Alkalinity (abbreviated RA in the examples) is determined by titrating a sample (about 10 cc.) of the composition with $0.1^N$ aqueous hydrochloric solution. From the number of milliliters of the acid actually required to neutralize the sample, the number of milliliters of acid that would be required to neutralize 100 milliliters of the composition of it contained a water to ethylene glycol ratio of 2:1 on a volume basis is computed and this latter number is the Reserve Alkalinity of the composition.

In the following examples, BR is used as an abbreviation for brass. All of the inhibited alcohol compositions of this invention described in the examples below were single phase compositions.

*Example I*

A copolymer of this invention (Copolymer A) was produced by forming a mixture of one gram of $CH_3Si(OC_2H_5)_3$ and 100 grams of a solution containing 1.55 wt.-percent potassium disilicate, 3.6 wt.-percent water and 94.85 wt.-percent ethylene glycol. The mixture was shaken and then allowed to stand for 16 hours at room temperature. There was so produced a solution of a copolymer composed of $CH_3SiO_{1.5}$ groups and $KOSiO_{1.5}$ groups dissolved in aqueous ethylene glycol.

*Example II*

Following the above-described procedures copolymers of this invention were produced from $K_2Si_2O_5$ and the following silanes:

| Copolymer | Formula of Starting Silane |
|---|---|
| A | $CH_3Si(OC_2H_5)_3$ |
| B | $CH_2=CHSi(OC_2H_5)_3$ |
| C | $C_2H_5Si(OC_2H_5)_3$ |
| D | $C_6H_5Si(OC_2H_5)_3$ |
| E |  |
| F | $NCCH_2CH_2Si(OC_2H_5)_3$ |
| G | $CH_3Si(ONa)O$ |
| H | $CH_3(OCH_2CH_2)_2OCH_2CH_2CH_2Si(OCH_3)_3$ |

In each preparation 10 parts of the starting silane per 15.5 parts of $K_2Si_2O_5$ were reacted (by weight).

The groups present in these various inhibitors and the relative amounts of these groups are shown below:

| Copolymer | Siloxane Groups | | $KOSiO_{1.5}$ Groups, Parts [1] |
|---|---|---|---|
| | Formula | Parts [1] | |
| A | $CH_3SiO_{1.5}$ | 19.3 | 80.7 |
| B | $CH_2=CHSiO_{1.5}$ | 21.3 | 78.7 |
| C | $C_2H_5SiO_{1.5}$ | 21.3 | 78.7 |
| D | $C_6H_5SiO_{1.5}$ | 25.8 | 74.2 |
| E | $CH_2(OH)CH(OH)CH_2O(CH_2)_3SiO_{1.5}$ | 30.0 | 70.0 |
| F | $NCCH_2CH_2SiO_{1.5}$ | 23.6 | 76.4 |
| G | $CH_3Si(ONa)O$ | 39.2 | 60.8 |
| H | $CH_3(OCH_2CH_2)_2OCH_2CH_2CH_2SiO_{1.5}$ | 32.3 | 67.7 |

[1] By weight per 100 parts by weight of the copolymer.

*Example III*

Aqueous ethylene glycol solutions of several copolymers of this invention were stored in closed containers at 100° C. to determine the storage stability of such solutions. The solutions contained the indicated amount of the copolymers, 94.9 parts by weight of ethylene glycol and 3.6 parts by weight of water. For comparison purposes, similar storage tests were run on aqueous ethylene glycol solutions of a silicate and other silicone-silicate copolymers. The results obtained are shown below.

| | Amount | Hours Till Gel Formed |
|---|---|---|
| Copolymers Of This Invention: | | |
| Copolymer A | 1.92 | 32 to 48 |
| Copolymer B | 1.97 | 32 to 48 |
| Copolymer C | 1.97 | 7 to 24 |
| Copolymer D | 2.09 | 32 to 48 |
| Copolymer E | 2.15 | >1,000 |
| Copolymer F | 2.03 | >1,000 |
| Copolymer G | 2.55 | >1,000 |
| Other Materials: | | |
| Silicate composed of $KOSiO_{1.5}$ | 1.55 | <7 |
| Copolymer composed of 24.7 wt. percent $C_5H_{11}SiO_{1.5}$ and 75.3 wt. percent $KOSiO_{1.5}$ | 2.06 | <7 |
| Copolymer of 24.4 wt. percent $(CH_3)_2SiO$ and 75.6 wt. percent $KOSiO_{1.5}$ | 2.05 | <7 |
| Copolymer of 27.2 wt. percent $C_2H_5Si(C_2H_3)O$ and 72.8 wt. percent $KOSiO_{1.5}$ | 2.13 | <7 |
| Copolymer of 28.2 wt. percent $O_2NC_6H_4SiO_{1.5}$ and 71.8 wt. percent $KOSiO_{1.5}$ | 2.16 | <7 |

*Example IV*

The 200-Hour Corrosion Test was conducted employing copolymers of this invention as corrosion inhibitors. For comparison purposes, the test was also run employing no inhibitor and also a silicate as a corosion inhibitor. The test liquids contained 100 parts by weight of ethylene glycol and 180 parts by weight of water to which were added one part by weight of the indicator inhibitor.

| Inhibitor | pH | | RA | | Weight Losses (mg. per 9 sq. in.) | | | | S.S.[3] |
|---|---|---|---|---|---|---|---|---|---|
| | I[1] | F[2] | I | F | Fe | Al[1] | BR | Cu | |
| Copolymer A | 11.1 | 10.9 | 56 | 45 | 7 | 0 | 23 | 25 | 5.5 |
| Copolymer B | 11.0 | 11.0 | 60 | 45 | 21 | 10 | 17 | 40 | 6 |
| Copolymer E | 11.2 | 10.8 | 57 | 62 | 3 | 0 | 1 | 4 | 5 |
| Copolymer F | 10.9 | 10.6 | 56 | 40 | 5 | 0 | 1 | 5 | 5.5 |
| Copolymer G | 11.3 | 10.8 | 70 | 56 | 4 | 0 | 3 | 14 | 5.5 |
| $K_2Si_2O_5$ [4] | 11.2 | 11.2 | 60 | 48 | 11 | 4 | 10 | 17 | 6 |
| None | 7.1 | 6.2 | 0 | 0 | 663 | 10 | 115 | 52 | 4.5 |

[1] I denotes initial value.
[2] F denotes final value.
[3] Solder Spot rating.
[4] 1.55 parts by weight inhibitor used in this run.

As used herein the symbol

denotes the cyclohexyl group ($C_6H_{11}$).

The copolymers of this invention can contain $SiO_2$ groups in addition to the groups indicated above. Copolymers containing $SiO_2$ groups can be produced by employing starting organosiloxanes containing $SiO_2$ groups.

What is claimed is:
1. A copolymer consisting essentially of:
(1) from 0.1 to 99.9 parts by weight of (a) a member selected from the group consisting of siloxane groups represented by the formula:

$$RSiO_{1.5}$$

wherein R is a member selected from the group consisting of the methyl, ethyl, phenyl and vinyl groups and (b) siloxane groups represented by the formula:

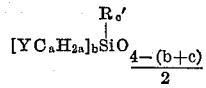

wherein Y is a member selected from the group consisting of the cyano group, $CH_2(OH)CH(OH)$ group, $$CH_2(OH)CH(OH)CH_2 \text{ group,}$$

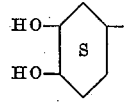

group, $CH_2(OH)CH(OH)CH_2O-$ group and $$R''(OCH_2CH_2)_n(OC_3H_6)_mO-$$

group, R'' is a member selected from the group consisting of the monovalent hydrocarbon groups and the hydrogen atom, n has a value of at least one, m has a value from 0 to 20 inclusive, the ratio of n to m is at least 2 to 1, a has a value of at least 2, $C_aH_{2a}$ is an alkylene group, the group represented by Y is separated from the silicon atom by at least two successive carbon atoms by the group represented by $C_aH_{2a}$, b has a value of from 1 to 3 inclusive, R' is a monovalent hydrocarbon group, c has a value from 0 to 2 inclusive, (b+c) has a value from 1 to 3 inclusive; and
(2) from 0.1 to 99.9 parts weight of at least one silicate group represented by the formula:

wherein M is a cation that forms a water soluble silicate selected from the group consisting of sodium, potassium, lithium, rubidium and tetraorgano ammonium cations, $d$ is the valence of the cation represented by M and has a value of at least 1 and $e$ has a value from 1 to 3 inclusive, said parts by weight of said groups in the copolymer being based on 100 parts by weight of the copolymer.

2. The copolymer of claim 1 wherein the groups defined in part (1) of claim 1 are present in an amount from 15 to 45 parts by weight and wherein the groups defined in part (2) of claim 1 are present in an amount from 55 to 85 parts by weight, said parts by weight of said groups in the copolymer being based on 100 parts by weight of the copolymer.

3. A copolymer consisting essentially of (1) from 15 to 45 parts by weight of groups represented by the formula:

$$CH_3SiO_{1.5}$$

and (2) from 55 to 85 parts by weight of groups having the formula:

$$KOSiO_{1.5}$$

said parts by weight of said groups in the copolymer being based on 100 parts by weight of the copolymer.

4. A copolymer consisting essentially of (1) from 15 to 45 parts by weight of groups represented by the formula:

$$CH_2=CHSiO_{1.5}$$

and (2) from 55 to 85 parts by weight of groups having the formula:

$$KOSiO_{1.5}$$

said parts by weight of said groups in the copolymer being based on 100 parts by weight of the copolymer.

5. A copolymer consisting essentially of (1) from 15 to 45 parts by weight of groups represented by the formula:

$$C_2H_5SiO_{1.5}$$

and (2) from 55 to 85 parts by weight of groups having the formula:

$$KOSiO_{1.5}$$

said parts by weight of said groups in the copolymer being based on 100 parts by weight of the copolymer.

6. A copolymer consisting essentially of (1) from 15 to 45 parts by weight of groups represented by the formula:

$$C_6H_5SiO_{1.5}$$

and (2) from 55 to 85 parts by weight of groups having the formula:

$$KOSiO_{1.5}$$

said parts by weight of said groups in the copolymer being based on 100 parts by weight of the copolymer.

7. A copolymer consisting essentially of (1) from 15 to 45 parts by weight of groups represented by the formula:

$$CH_2(OH)CH(OH)CH_2O(CH_2)_3SiO_{1.5}$$

and (2) from 55 to 85 parts by weight of groups having the formula:

$$KOSiO_{1.5}$$

said parts by weight of said groups in the copolymer being based on 100 parts by weight of the copolymer.

8. A copolymer consisting essentially of (1) from 15 to 45 parts by weight of groups represented by the formula:

$$NCCH_2CH_2SiO_{1.5}$$

and (2) from 55 to 85 parts by weight of groups having the formula:

$$KOSiO_{1.5}$$

said parts by weight of said groups in the copolymer being based on 100 parts by weight of the copolymer.

9. A copolymer consisting essentially of (1) from 15 to 45 parts by weight of groups represented by the formula:

$$CH_3Si(ONa)O$$

and (2) from 55 to 85 parts by weight of groups having the formula:

$$KOSiO_{1.5}$$

said parts by weight of said groups in the copolymer being based on 100 parts by weight of the copolymer.

10. A copolymer consisting essentially of (1) from 15 to 45 parts by weight of groups represented by the formula:

$$CH_3(OCH_2CH_2)_2OCH_2CH_2CH_2SiO_{1.5}$$

and (2) from 55 to 85 parts by weight of groups having the formula:

$$KOSiO_{1.5}$$

said parts by weight of said groups in the copolymer being based on 100 parts by weight of the copolymer.

11. A copolymer consisting essentially of:
(1) from 0.1 to 99.8 parts by weight of (a) a member selected from the group consisting of siloxane groups represented by the formula:

$$RSiO_{1.5}$$

wherein R is a member selected from the group consisting of the methyl, ethyl, phenyl and vinyl groups and (b) siloxane groups represented by the formula:

$$[YC_aH_{2a}]_bSiO_{\frac{4-(b+c)}{2}}^{R'_c}$$

wherein Y is a member selected from the group consisting of the cyano group, $CH_2(OH)CH(OH)$ group, $CH_2(OH)CH(OH)CH_2$ group,

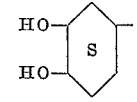

group, $CH_2(OH)CH(OH)CH_2O-$ group and the $$R''(OCH_2CH_2)_n(OC_3H_6)_mO-$$

group, R'' is a member selected from the group consisting of the monovalent hydrocarbon groups and the hydrogen atom, $n$ has a value of at least one, $m$ has a value from 0 to 20 inclusive, the ratio of $n$ to $m$ is at least 2 to 1, $a$ has a value of at least 2, $C_aH_{2a}$ is an alkylene group, the group represented by Y is separated from the silicon atom by at least two successive carbon atoms by the group represented by $C_aH_{2a}$, $b$ has a value of from 1 to 3 inclusive, R' is a monovalent hydrocarbon group, $c$ has a value from 0 to 2 inclusive, $(b+c)$ has a value from 1 to 3 inclusive;

(2) from 0.1 to 99.8 parts by weight of at least one silicate group represented by the formula:

$$[M_{1/d}O]_eSiO_{4-e/2}$$

wherein M is a cation that forms a water soluble silicate selected from the group consisting of sodium, potassium, lithium, rubidium and tetraorgano ammonium cations, $d$ is the valence of the cation represented by R' and has a value of at least 1 and $e$ has a value from 1 to 3 inclusive; and (3) from 0.1 to 99.8 parts by weight of a siloxane group selected from the group consisting of the groups represented by the formulae:

$$R'''_2SiO_{1.5}$$
$$R_2'SiO$$

and $$R_3'SiO_{0.5}$$

wherein R''' is a monovalent hydrocarbon group other than the methyl, ethyl, phenyl and vinyl groups and R' has the above-defined meaning, said parts by weight of said groups in the copolymer being based on 100 parts by weight of the copolymer.

12. The copolymer of claim 11 wherein the groups defined in part (1) of claim 10 are present in an amount from 10 to 45 parts by weight, wherein the groups defined in part (2) of claim 10 are present in an amount from 50 to 85 parts by weight and wherein the groups defined by part (3) of claim 10 are present in an amount from 5 to 15 parts by weight, said parts by weight of said groups in the copolymer being based on 100 parts by weight of the copolymer.

13. A copolymer consisting essentially of:
(1) from 0.1 to 99.9 parts by weight of siloxane groups represented by the formula:

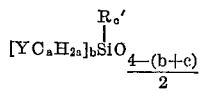

wherein Y is a

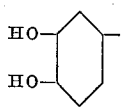

group, $a$ has a value of at least 2, $C_aH_{2a}$ is an alkylene group, the group represented by Y is separated from the silicon atom by at least two successive carbon atoms by the group represented by $C_aH_{2a}$, $b$ has a value of from 1 to 3 inclusive, R' is a monovalent hydrocarbon group, $c$ has a value from 0 to 2 inclusive, $(b+c)$ has a value from 1 to 3 inclusive; and
(2) from 0.1 to 99.9 parts by weight of at least one silicate group represented by the formula:

wherein M is a cation that forms a water soluble silicate selected from the group consisting of sodium, potassium, lithium, rubidium and tetraorgano ammonium cations, $d$ is the valence of the cation represented by M and has a value of at least 1 and $e$ has a value from 1 to 3 inclusive, said parts by weight of said groups in the copolymer being based on 100 parts by weight of the copolymer.

14. A copolymer consisting essentially of:
(1) from 0.1 to 99.9 parts by weight of siloxane groups represented by the formula:

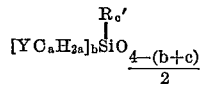

wherein Y is a $CH_2(OH)CH(OH)CH_2O$— group, $a$ has a value of at least 2, $C_aH_{2a}$ is an alkylene group, the group represented by Y is separated from the silicon atom by at least two successive carbon atoms by the group represented by $C_aH_{2a}$, $b$ has a value of from 1 to 3 inclusive, R' is a monovalent hydrocarbon group, $c$ has a value from 0 to 2 inclusive, $(b+c)$ has a value from 1 to 3 inclusive; and
(2) from 0.1 to 99.9 parts by weight of at least one silicate group represented by the formula:

wherein M is a cation that forms a water soluble silicate selected from the group consisting of sodium, potassium, lithium, rubidium and tetraorgano ammonium cations, $d$ is the valence of the cation represented by M and has a value of at least 1 and $e$ has a value from 1 to 3 inclusive, said parts by weight of said groups in the copolymer being based on 100 parts by weight of the copolymer.

15. A copolymer consisting essentially of:
(1) from 0.1 to 99.9 parts by weight of siloxane groups represented by the formula:

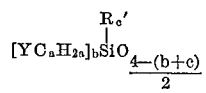

wherein Y is a $R''(OCH_2CH_2)_n(OC_3H_6)_mO$— group, R'' is a member selected from the group consisting of the monovalent hydrocarbon groups and the hydrogen atom, $n$ has a value of at least one, $m$ has a value from 0 to 20 inclusive, the ratio of $n$ to $m$ is at least 2 to 1, $a$ has a value of at least 2, $C_aH_{2a}$ is an alkylene group, the group represented by Y is separated from the silicon atom by at least two successive carbon atoms by the group represented by $C_aH_{2a}$, $b$ has a value of from 1 to 3 inclusive, R' is a monovalent hydrocarbon group, $c$ has a value from 0 to 2 inclusive, $(b+c)$ has a value from 1 to 3 inclusive; and
(2) from 0.1 to 99.9 parts by weight of at least one silicate group represented by the formula:

wherein M is a cation that forms a water soluble silicate selected from the group consisting of sodium, potassium, lithium, rubidium and tetraorgano ammonium cations, $d$ is the valence of the cation represented by M and has a value of at least 1 and $e$ has a value from 1 to 3 inclusive, said parts by weight of said groups in the copolymer being based on 100 parts by weight of the copolymer.

References Cited
UNITED STATES PATENTS

| | | | |
|---|---|---|---|
| 2,153,972 | 4/1939 | McDaniel | 23—110.1 |
| 2,374,035 | 4/1945 | Nutting | 23—110.1 |
| 2,587,636 | 3/1952 | MacMullen | 260—46.5 |
| 2,687,388 | 8/1954 | McNulty et al. | 260—46.5 |
| 2,762,785 | 9/1956 | Cooper | 260—42 |
| 2,967,168 | 1/1961 | Hurd | 260—825 |
| 3,015,629 | 1/1962 | Truitt | 252—75 |
| 3,015,645 | 1/1962 | Tyler | 260—825 |
| 3,046,230 | 7/1962 | Berger | 252—75 |
| 3,061,587 | 10/1962 | Rust et al. | 260—46.5 |
| 3,065,202 | 11/1962 | Bluestein | 260—46.5 |
| 3,087,909 | 4/1963 | Morehouse et al. | 260—448.8 |
| 3,121,692 | 2/1964 | Morehouse et al. | 252—75 |
| 3,131,072 | 4/1964 | Taulli | 260—448.2 |

DONALD E. CZAJA, *Primary Examiner.*

JOSEPH L. SCHOFER, WILLIAM H. SHORT, LEON J. BERCOVITZ, *Examiners.*

M. I. MARQUIS, *Assistant Examiner.*